March 22, 1955     E. H. PEDROIA     2,704,632
AUTOMATIC AIR CONTROL DEVICE FOR LIQUID PRESSURE TANKS
Filed Jan. 4, 1954     2 Sheets-Sheet 1
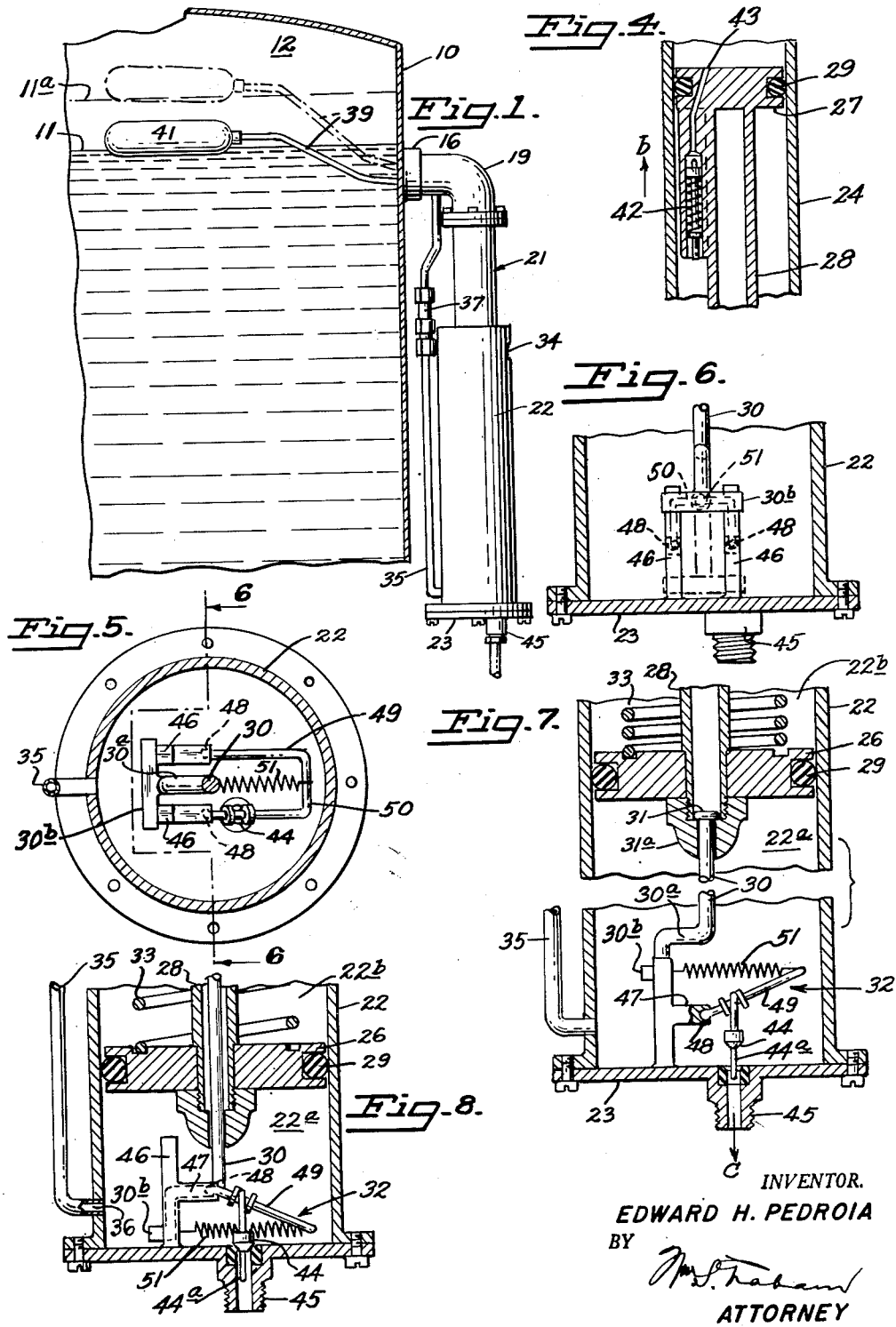
INVENTOR.
EDWARD H. PEDROIA
BY
ATTORNEY

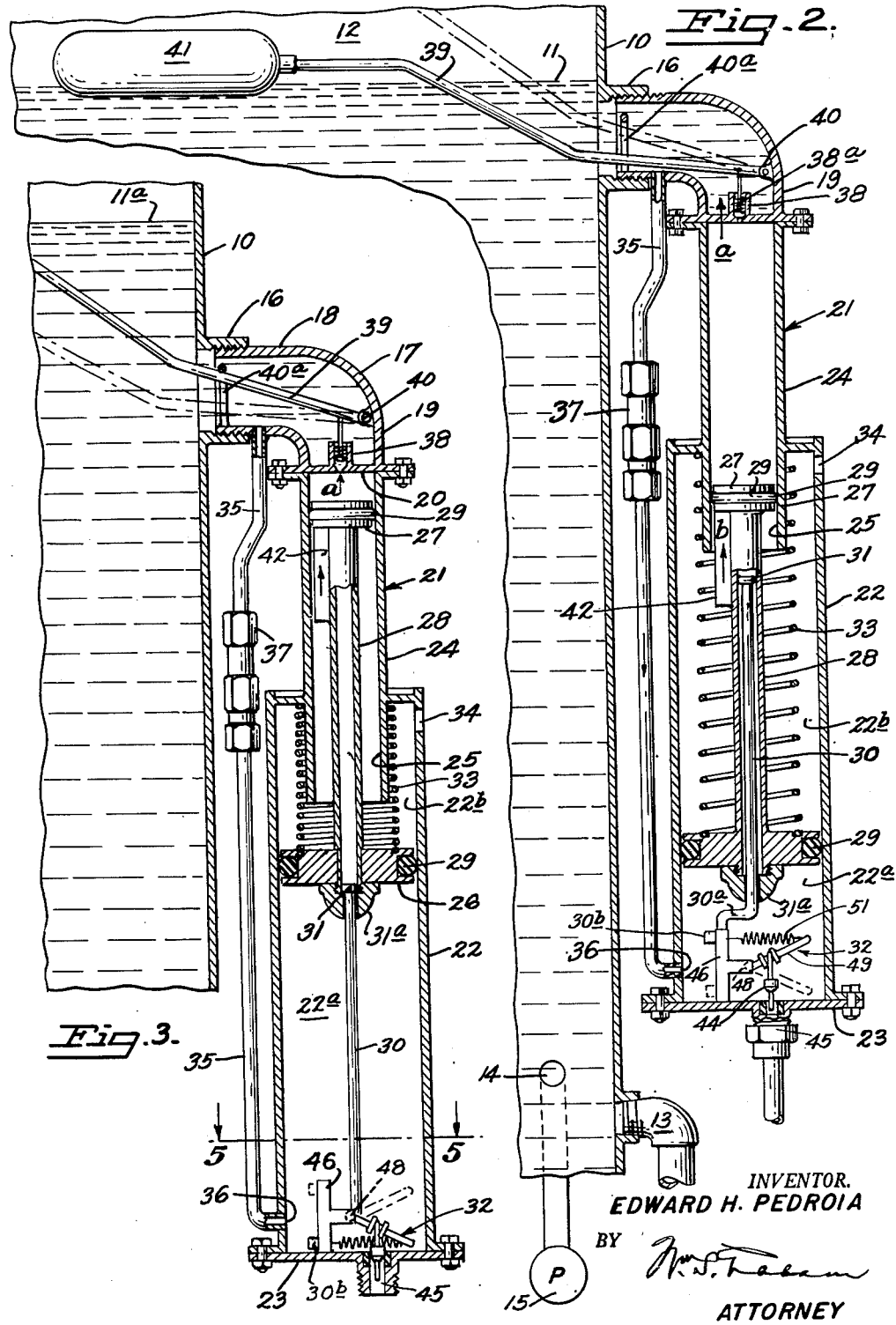

United States Patent Office 2,704,632
Patented Mar. 22, 1955

2,704,632

AUTOMATIC AIR CONTROL DEVICE FOR LIQUID PRESSURE TANKS

Edward H. Pedroia, Monte Rio, Calif.

Application January 4, 1954, Serial No. 402,006

12 Claims. (Cl. 230—52)

This invention relates broadly to air control devices for air pressure tanks for automatically maintaining a suitable volume of air overlying a liquid in a pressure tank and exerting a pressure on the liquid. The invention has particular application to control of a body of air at the head of a water tank, to which use the specification herein is directed as an exemplification of one advantageous environment for employment of the invention.

This application relates to and is a continuation in part of my copending application, Serial No. 284,842, filed April 28, 1952, in which a float controls flow of water under hydraulic pressure through a valve in the flow line into a hydraulic pressure chamber responsive to water level in a supply tank, whereas in the present application the float operates responsive to water level in a supply tank to control opening and closing of an air valve in an air pressure chamber, whereby a piston in a hydraulic pressure chamber may be moved by hydraulic pressure in the supply tank, an air piston in both applications forcing air into the supply tank through a one-way check valve. The end result accomplished by both applications is broadly similar.

In my said copending application I have quite fully stated the environment in which the apparatus of this application is adapted to operate, and briefly, consists of a storage tank having an inlet and an outlet for water, the inlet flow being automatically regulated by suitable well-known means to replenish water to the supply tank at a differential of tank pressure. For example, if the optimum of tank pressure is predetermined at 40 pounds, the inlet control may conveniently be adjusted whereby it does not go into operation until tank pressure drops to 30 pounds and continues until tank pressure is 50 pounds, in which manner the pressure source (usually a pump) is effective to maintain a workable pressure in the tank but does not operate to refill the tank every time a small quantity of liquid is withdrawn from the tank, thus saving power and also wear on the pump.

In such pneumatic pressure tank systems, as water is pumped into the tank the air space at the top of the tank is gradually reduced until the air therein is compressed to a predetermined point of water level at which the air exerts a constant pressure on the water within the tank whereby, when a discharge valve is open, the water is forced from the tank into a distributing outlet conduit, the air also serving to absorb hydraulic hammer or shock upon the pump or upon a meter associated with the water system.

Since portions of this air cushion will gradually become mixed with the discharged water and also since when water is withdrawn the air cushion expands and decreases its pressure, it is desirable to supply an auxiliary air supply to the tank to maintain the air body substantially uniform for practical working conditions. The concept of devices for this purpose is not broadly new, since other devices have endeavored to meet the need by injectors in the water supply line, mechanical or manual pumps supplying air to the tank and other intricate and expensive mechanical structures which lack a universality of adaptation to various types of pneumatic pressure tanks and the like.

It is therefore an object of this invention to provide an air control means simple in construction and efficient in operation for maintaining a substantially uniform volume of air in pneumatic pressure liquid tanks; to provide such a control device as a unitary assembly for universal adaptation in such tanks and which is automatically operative responsive to the pressure in the tank as governed by the water level in the tank.

Briefly, the invention may be described as comprising a hollow nipple for tapping into the wall of a pneumatic pressure liquid tank adjacently below a predetermined desired water level, the plug communicating with the interior of the tank and being a means for mounting a control apparatus on the tank as a unitary assembly. The unitary assembly comprises a tubular elbow threadedly mounted in the nipple, a tube having one end communicating through said elbow with the liquid in the tank, the tube having its opposite end communicating with a pressure chamber of a hydraulic pressure cylinder through a relatively small orifice, the hydraulic pressure chamber also having a relatively large discharge or waste valve at its lower end the opening and closing of which is controlled by a snap action mechanism responsive to the respective pressure and reverse strokes of a hydraulic piston in the hydraulic cylinder. The opposite end of the hydraulic cylinder has a coaxially aligned air pressure cylinder of relatively smaller diameter and the piston of which is integrally connected for unison reciprocation by the excursions of the hydraulic piston, for injecting air into the liquid tank through a one-way valve which is normally maintained closed and the opening of which is controlled by a float in the supply tank.

One form in which the invention may be embodied is described herein and illustrated in the accompanying drawing, it being understood that changes in form, shape, size, degree and minor details may be resorted to without departing from the inventive concept which is defined in the appended claims.

In the drawings:

Fig. 1 is a vertical side elevation of the invention, a supply tank being shown fragmentarily in section, and a float member being shown at an operative position in broken lines.

Fig. 2 is a transverse vertical longitudinal central section of the control apparatus, a supply tank being shown fragmentarily in section.

Fig. 3 is a transverse vertical longitudinal section of the control apparatus, with parts at a different operative position as compared with Fig. 2.

Fig. 4 is an enlarged fragmentary transverse vertical longitudinal central section of a portion of air cylinder and piston shown in Fig. 3.

Fig. 5 is an enlarged horizontal transverse section on line 5—5 of Fig. 3.

Fig. 6 is a fragmentary vertical transverse section on line 6—6 of Fig. 5.

Fig. 7 is an enlarged fragmentary broken vertical transverse section of apparatus shown in Fig. 3.

Fig. 8 is an enlarged fragmentary vertical transverse section of apparatus shown in Fig. 2.

Referring to the drawings in which like reference characters indicate corresponding parts in the several views, 10 is a pneumatic pressure tank for liquid, for which it has been predetermined that water at a given level 11 will compress a body of air thereabove in an air pressure chamber 12, sufficiently to exert a constant pressure on the water to discharge the same into a suitable distributing system through an outlet 13, a suitable water inlet 14 and pump 15 or other water pressure source being presumed.

The side wall of the tank, adjacently below the predetermined water level, has a tubular open threaded flanged nipple 16 which communicates with the interior of the tank and the water therein. Within this nipple is threadedly mounted a tubular elbow 17 which is the means for supporting the control assembly to the tank as a unit, the elbow 17 having a neck portion 18 which engages in the nipple and having at its opposite L end 19 a head closure plate 20 for a pressure cylinder assembly generally indicated 21.

The hydraulic pressure cylinder assembly comprises a hydraulic cylinder generally indicated 22 closed at its lower end by a closure plate 23 designated as a base plate to distinguish from head plate 20. The hydraulic cylinder communicates at its opposite or upper end with a coaxial air cylinder 24 of lesser diameter, a diameter ratio of 2 to 1 being found satisfactory. The lower end of the air cylinder preferably extends into the hydraulic cylinder for substantially ⅕ of the length of the hydraulic cylinder, as at 25, the extension being for the dual purpose of lengthening the air cylinder and providing a guide for an air piston therein and a coil spring member externally thereof. The closure plate 20 closes the opposite or head end of the air cylinder.

A unitary piston structure is reciprocable in unison in the cylinders 22 and 24, comprising hydraulic piston 26 in the hydraulic cylinder 22 and an air piston 27 in the air cylinder 24. The two pistons are connected and relatively spaced by a hollow elongated tubular connecting rod 28 which is substantially longer than the air cylinder so that when the air piston is at the top of its compression stroke the hydraulic piston will be substantially spaced from the lower or open end portion 25 of the air cylinder. The air piston closes the adjacent end of the tube of the connecting rod 28. The pistons are operatively opposites in the sense that the pressure stroke of the air piston is the non-pressure stroke of the hydraulic piston, and vice versa. The pressure stroke of the hydraulic piston is deemed to be when the piston is moved toward the closure plate 23 and a discharge valve 44, since it is then discharging water, whereas its opposite stroke is an intake stroke.

The pistons 26, 27 may be of any conventional type, the illustrated preferred form being circular discs having circumferential groove for receiving a resilient ring gasket 29 which is circular in cross section through its body and generally designated in the trade as an O-ring. It will be observed that the hydraulic piston 26 divides the hydraulic cylinder into a pressure chamber 22a, and a neutral or negative chamber 22b, which is open to atmospheric pressure through vent 34.

In the hollow tube of the connecting rod 28 is a valve-operating slide rod 30 having a lesser length within the hollow connecting rod than the length of the tube, the slide rod having at its end within the tubular connecting rod a head 31 which, upon upward movement of the hydraulic piston, engages a closure nut 31a mounted at the end of the connecting rod tube upon which the hydraulic piston is mounted. Said end portion of the slide rod extends slidably through the nut 31a and the hydraulic piston, said extended portion being angularly bent from alignment as at 30a and terminating in a cross-bar 30b which operates a suitable snap-action mechanism generally indicated 32, the components of which being hereafter described.

The hydraulic piston is normally urged downwardly towards the snap action mechanism and the bottom of the compression chamber by a coil spring 33 which is mounted in the neutral chamber 22b and having one end bearing on the non-compression face of the hydraulic piston and its opposite end circumferential of the extended portion 25 of the air cylinder, the movement of the hydraulic piston manifestly simultaneously moving the air piston in unison. The negative or non-compression sides of pistons 26 and 27 are maintained subject to atmospheric pressure by the vent opening 34 in the neutral portion 22b of the hydraulic cylinder.

Means are provided for communication between the hydraulic compression chamber 22a and the water in the supply tank adjacent to the predetermined water level 11, in communication with the neck 18 of the elbow 17, and therefore in communication with the water in the supply tank, is a feed conduit pipe 35 which communicates at its opposite end with the lower end of the hydraulic cylinder through an opening 36 which is relatively small as compared with the diameter of an outlet or discharge valve in the base plate 23 of the compression chamber. A coupling joint 37 is illustrated in the length of the feed conduit 35, but this is merely a mechanical facility for assembly and performs no function which would not be served by an integral feed conduit which may be substituted.

A valve system is employed whereby the hydraulic pressure in the tank, superinduced by the overlying air pressure in the air chamber 12, may cause the air piston 27 to pump air into the air chamber 12 for maintaining the pneumatic pressure in that chamber substantially constant to the extent of exerting a practically uniform pressure on the water in the supply tank to facilitate the discharge thereof. In the head plate 20 of the air cylinder is a one-way spring-loaded check valve 38 between the air cylinder and the tubular elbow 17, this valve being normally closed responsive to a lightly tensioned spring 38a which when opened permits flow therethrough from the air cylinder 24 through the elbow 17 and into the supply tank, as indicated by corresponding adjacent arrow a. This valve 38 is further maintained normally closed by the lever bar 39 pivotally mounted adjacent to the valve as at 40 and passing through a slot guide 40a and having at its opposite end within the tank a float 41, the bar 39 resting on an end of the valve when the float is at a lowered position indicating that the predetermined water level is maintained in the tank and there is a sufficient amount of air in chamber 12 above the water to provide the desired pneumatic pressure. The valve 38 opens responsive to pressure induced by the pressure stroke of the air piston.

Another one-way spring-loaded check valve 42 is mounted on the air piston to control an opening 43 which communicates between the air cylinder and the negative side of the piston in the neutral portion 22b of the hydraulic cylinder which is subject to atmospheric pressure only. This valve 42 opens to permit flow of air in the direction of the corresponding adjacent arrow b responsive to a vacuum drawn in the air cylinder by the reverse non-pressure downstroke of the air piston. The valves 38 and 42 are preferably of the type commonly called pneumatic tire valves or Schrader valves which are well known in the art.

A third one-way valve designated a plug valve 44 is positioned in the base plate 23 of the hydraulic compression chamber to open and close a waste pipe 45. The valve 44 has a guide stem 44a which enters the waste pipe 45 and has its opposite end pivotally connected to a yoke of the snap action mechanism 32. The direction of flow through the valve 44 when open is indicated by arrow c. This valve has greater discharge capacity than the inlet opening 36.

The snap action mechanism may be of any suitable type, the form preferred herein comprising a pair of relatively spaced upstanding transversely aligned posts 46 offset from center of the base plate. Substantially centrally of the height of the posts each post has a rearward extended arm 47 having at its free end a relatively small socket bore 48 into which fit the ends of two legs of a yoke 49 with sufficient looseness that the yoke may wobble as though pivoted on said arms, whereby the cross bar 50 of the yoke may move upwardly and downwardly through an arc of which the arms 49 are the radius. A tensioned coil spring 51 is connected between the cross bar 50 and the lower terminal end portion of the slide rod 30, the adjacent end portion of the slide rod being bent substantially perpendicular from its axial position and terminating in the integral cross bar 30b which slides upon the face of the posts 46 when actuated upwardly and downwardly by the slide rod 30.

The mode of operation is as follows:

For explanation purposes a normal position of the mechanism may be assumed when the tank is empty at which time the float is at its downward position holding valve 38 closed, the hydraulic and air pistons 26, 27 are at downward position responsive to spring 33, and cylinder 24 is charged with air which has entered therein through valve 42 due to suction upon the down stroke of air piston 27, the valve 42 opening for air flow in direction of arrow b from the neutral chamber 22 which is open to atmospheric pressure through vent 34. Under such conditions the yoke 49 of the snap action mechanism is at downward position and discharge or waste valve 44 is closed. Water is permitted to flow into the tank to the predetermined level 11 responsive to pump and conduit 14, 15, subject to the usual differential pressure control means, not shown.

Manifestly the tank is of a desired capacity so that the predetermined water level 11 is above the open nipple connection 16 and the air chamber 12 is thereabove. When the water is maintained at the predetermined level 11, it is because there is an ample amount of compressed air thereabove in chamber 12 to provide against hydraulic shock and to exert a pressure on the water to expel it. This maintains the float 41 at its lowered position at which the pivoted end portion of lever 39 bears upon and maintains the valve 38 closed with a very substantial pressure because of the leverage in close proximity to the pivoted end of lever 39. If, however, the air progressively becomes reduced in volume, usually due to appreciable quantities thereof intermixing with the discharge water, the water level rises in the tank to a level exemplified at 11a which raises the float 41 to the higher water level and releases the closing pressure on valve 38.

It should be borne in mind that the air pressure in the air chamber 12 varies but is never exhausted and that the water in the tank always has behind it a substantial differential pressure from the source of supply. Therefore, since the conduit 35 communicates with the water in the tank, this hydraulic pressure causes a continuous hydraulic pressure through the conduit 35 and the relatively small orifice 36 into pressure chamber 22a. This hydraulic pressure is greater than the tension value of spring 33 singly, but it is not sufficient to raise the pistons 26 and 27 against the combined contra-pressure of spring 33 plus the confined body of air in the air cylinder 24 when the valve 38 is closed by the float lever 39.

However, when the quantity of air in air chamber 12 becomes reduced in volume and pressure as aforesaid, the water in the tank rises, as indicated by the broken line 11a, whereupon float 41 and its lever 39 are raised, thereby removing the closing pressure on valve 38. This does not automatically open valve 38 since the valve is also maintained lightly closed by a relatively lightly tensioned spring 38a, since otherwise water would flow into air chamber 24, both by gravity and the suction downstroke of the air piston, but because of the light tension of spring 38a it offers very little resistance to opening the valve upon the compression upward stroke of air piston 27.

The valve 38 being free to open by the raising of the float responsive to raising the water level when the air supply is diminished, and the hydraulic pressure being greater than the tension value of spring 33, the hydraulic piston is thereby raised by the hydraulic tank pressure, and since the air in cylinder 24 may then flow through valve 38 (subject only to the very light seating tension of spring 38a), the air is pumped into the tank for replenishing purposes. It should be borne in mind that the hydraulic pressure chamber and piston are of greater diameter than the air cylinder and piston whereby the pressure in the air cylinder is increased proportionately.

The movement of the pistons operate the snap-mechanism in the following manner. The slide bar 30 being shorter than the stroke of the pistons, when the hydraulic and air pistons approach their uppermost positions the head 31 of slide bar 30 will be engaged by nut 31a and the further movement of the pistons to complete their stroke will lift the cross bar 30b from the bottom to the top of posts 46. As the cross bar passes substantially beyond the center point of its travel the tension of spring 51 will be upwardly whereby the yoke 49 will snap to an upward position lifting the plug valve 44 from its seat whereby the water in the compression chamber 22a loses its pressure and may discharge through waste pipe 45 upon the reverse or down stroke of the pistons which is accomplished by spring 33, the spring 38a reseating valve 38, and a new supply of air passing through valve 42.

When the hydraulic piston reaches the ultimate of its downstroke the slide rod will have slid longitudinally into tube 28 and the nut 31a will contact the angular bend 30a and push the cross bar 30b downward on the face of the posts 46. When cross bar 30b shall have passed the center point of its excursion the tension of spring 51 is downwardly thus operating to snap the yoke 49 downwardly and close plug valve 44, whereupon the piston will remain down responsive to spring 33 as long as the water is at the predetermined level 11 which means that there is an adequate desired amount of air in chamber 12, and that the float lever 39 rests upon valve 38 to keep it closed against lifting by the hydraulic pressure. As soon as the air becomes less than the desired amount, the water level will again rise, thereby raising the float, whereupon the control mechanism will automatically again repeat its operation, and will continue repeating its operation successively until sufficient air is pumped into the water-supply tank to maintain an air pressure sufficient to maintain the water level in the tank substantially at its predetermined level.

A trifle of water will be wasted from the discharge valve 44 each time the control apparatus functions, but this is an inconsequential amount compared with the efficiency of the apparatus to maintain a normal pneumatic pressure of air in the water tank.

Having described the invention, what is claimed as new and patentable is:

1. In pneumatic pressure liquid tanks, an air control apparatus comprising a hydraulic cylinder and an air cylinder, each cylinder having a piston reciprocal therein providing a pressure chamber in each cylinder, means connecting said pistons in relative spaced relation for unison reciprocation, a tube for communicating between the hydraulic pressure chamber and the water in a liquid tank whereby water may flow from the tank into the hydraulic pressure chamber, a discharge valve in the hydraulic pressure chamber for discharging water therefrom, said air pressure chamber having a valve control air vent therein for communication with the water in the tank, means for moving the connected pistons in unison in direction of the hydraulic pressure chamber and the discharge valve therein, a float member for floating on the surface of the water in the tank for controlling the valve in the vent of the air cylinder, and means operative responsive to the reciprocation of the hydraulic piston for opening the discharge valve in the hydraulic pressure chamber when the hydraulic piston has reached the substantial maximum of its non-pressure stroke and closing said discharge valve when the hydraulic piston has reached the substantial maximum of its pressure stroke whereby water in the hydraulic pressure chamber may be discharged from said pressure chamber by the pressure stroke of the hydraulic piston.

2. An air pressure control device of the character described having the elements of claim 1 and in which the cylinders are relatively coaxially aligned.

3. An air pressure control device of the character described having the elements of claim 1 and in which the hydraulic cylinder has a greater diameter than the air cylinder.

4. A control apparatus for supplying air to an air chamber over a predetermined level of water in a water supply tank including the elements of claim 1 and in which there is a hollow connecting rod connecting said pistons in relative spaced relation for said unison reciprocation, and the means for opening and closing the discharge valve includes a slide rod in the hollow connecting rod and a snap action mechanism operated by the slide rod.

5. In pneumatic pressure liquid supply tanks, an air control apparatus having the elements of claim 1 and in which the means for moving the connected pistons in the direction of the discharge valve includes a coil spring of lesser tension value than the hydraulic pressure of the water from the water supply tank.

6. A control apparatus for supplying air to an air chamber over a predetermined level of water in a water supply tank, comprising a unitary assembly having means for mounting as a unit in communication with water in the water supply tank and including a hydraulic cylinder and an air cylinder, said cylinders being relatively coaxially aligned, each cylinder having a piston reciprocal therein providing a pressure chamber in each cylinder at the relatively opposite ends of the cylinder bodies, means connecting said pistons in relative spaced relation for unison reciprocation, a tube for communicating between the hydraulic pressure chamber and the water in the supply tank whereby water may flow from the supply tank into the hydraulic pressure chamber, a discharge valve in the hydraulic pressure chamber for discharge of water therefrom, said air pressure chamber having a valve controlled air vent therein for communication with the water supply tank, means for moving the connected pistons in unison in direction of the hydraulic pressure chamber and the discharge valve therein, a float member for floating on the surface of the water in the supply tank and being adapted for rising and falling with the water level in the tank for controlling the valve in the vent of the air chamber, and means operative responsive to the reciprocation of the pistons for opening the discharge valve in the hydraulic pressure chamber when the hydraulic piston has reached the substantial maximum of its non-pressure stroke and closing said discharge valve when the hydraulic piston has reached the substantial maximum of its pressure stroke whereby water in the hydraulic pressure chamber may be discharged from said pressure chamber by the pressure stroke of the hydraulic piston.

7. An air pressure control device of the character described having the elements of claim 6 and in which the hydraulic cylinder has a greater diameter than the air cylinder.

8. An air pressure control device of the character described having the elements of claim 6 and in which a hollow connecting rod connects said pistons in relatively spaced relation, and the means for opening and closing the discharge valve includes a slide rod in the hollow connecting rod and a snap action mechanism operated by the slide rod responsive to reciprocation of the hydraulic piston.

9. In pneumatic pressure water supply tanks, an air control apparatus having the elements of claim 6 and in which the pistons are adapted for movement towards the air cylinder responsive to pressure in the supply tank for moving the connected pistons in direction of the air cylinder, and the means for moving the connected pistons in unison in the direction of the hydraulic pressure chamber and the discharge valve includes a coil spring of lesser tension value than the hydraulic pressure from the water supply tank.

10. An air pressure control device of the character described having the elements of claim 6 and in which the float has a valve operating lever rod for controlling said air vent valve responsive to the rising and falling of the water level and the float thereon.

11. A control apparatus for supplying air to an air chamber over a predetermined level of water from a water supply tank, comprising a cylinder body structure including a hydraulic cylinder and an air cylinder, each cylinder having a piston reciprocal therein providing a pressure chamber in each cylinder, said pistons being connected and reciprocal in unison, a tube for communicating between the hydraulic pressure chamber and the water in the supply tank whereby water may flow from the supply tank into the hydraulic pressure chamber responsive to pressure in the supply tank for moving the connected pistons in the direction of the air cylinder, a discharge valve in the hydraulic pressure chamber for discharge of water therefrom, a float member for floating on the surface of the water in the supply tank and being adapted for rising and falling with the water level in the tank, valve means for controlling respective flows of water from the supply tank into the hydraulic pressure chamber and of air from the air cylinder into the water supply tank, said float having a valve operating lever rod for controlling said valve means responsive to the rising and falling of the water level and float thereon, means for moving the connected pistons in unison in the direction of the hydraulic pressure chamber and the discharge valve therein, and a snap action mechanism operative responsive to the reciprocation of the piston for respectively opening and closing the discharge valve in the hydraulic pressure chamber.

12. An air pressure control device of the character described having the elements of claim 11 and in which there is a one-way valve control means to admit air into the air pressure chamber.

References Cited in the file of this patent

UNITED STATES PATENTS

| | | |
|---|---|---|
| 2,318,782 | Jorgensen | May 11, 1943 |
| 2,347,472 | Dorward | Apr. 25, 1944 |